United States Patent
Lin et al.

(10) Patent No.: US 8,482,864 B2
(45) Date of Patent: Jul. 9, 2013

(54) COMPACT IMAGING LENS ASSEMBLY

(75) Inventors: Ming Ching Lin, Taichung (TW); Hsiang Chi Tang, Taichung (TW); Tsung Han Tsai, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 275 days.

(21) Appl. No.: 12/789,694

(22) Filed: May 28, 2010

(65) Prior Publication Data

US 2011/0134545 A1 Jun. 9, 2011

(30) Foreign Application Priority Data

Dec. 3, 2009 (TW) .............................. 98141324 A

(51) Int. Cl.
*G02B 9/10* (2006.01)
*G02B 13/00* (2006.01)

(52) U.S. Cl.
CPC ............... *G02B 13/003* (2013.01); *G02B 9/10* (2013.01)
USPC ........................................ 359/717; 359/795

(58) Field of Classification Search
CPC ................................ G02B 13/003; G02B 9/10
USPC .................... 359/717, 793, 795, 692
See application file for complete search history.

(56) References Cited

U.S. PATENT DOCUMENTS

| 5,677,798 | A | * | 10/1997 | Hirano et al. | ................. | 359/717 |
| 7,463,433 | B2 |   | 12/2008 | Tang |   |   |
| 7,525,741 | B1 | * | 4/2009 | Noda | ............................ | 359/795 |
| 2008/0100926 | A1 | * | 5/2008 | Chen et al. | ..................... | 359/717 |

OTHER PUBLICATIONS

Geary, Joseph M. Introduction to Lens Design: with Practical ZEMAX Examples. Richmond, VA: Willmann-Bell, 2007. 23. Print.*

* cited by examiner

*Primary Examiner* — Ricky Mack
*Assistant Examiner* — Zachary Wilkes
(74) *Attorney, Agent, or Firm* — Morris Manning & Martin LLP; Tim Tingkang Xia, Esq.

(57) ABSTRACT

This invention provides a compact imaging lens assembly, in order from an object side to an image side, including a first lens element with positive refractive power having a convex object-side surface and a concave image-side surface with at least one of the two surfaces thereof being aspheric, a second lens element with negative refractive power having a concave object-side surface and a convex image-side surface with at least one of the two surfaces thereof being aspheric, and an aperture stop disposed between the first and second lens elements. There are only two lens elements with refractive power in the compact imaging lens assembly. By such an arrangement, total track length and optical sensitivity of the compact imaging lens assembly can be reduced while a high image quality can also be obtained.

19 Claims, 10 Drawing Sheets

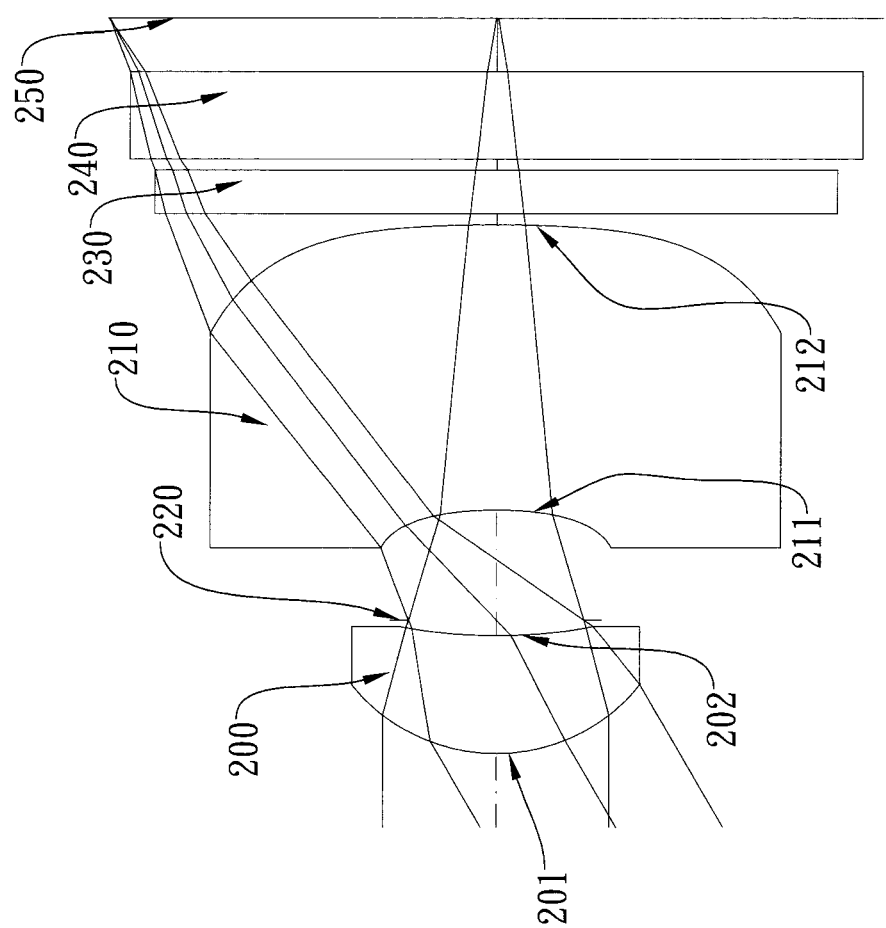

| TABLE 1 | | | | | | |
|---|---|---|---|---|---|---|
| (Embodiment 1) | | | | | | |
| f = 2.91 mm, Fno = 2.80, HFOV = 26.5 deg. | | | | | | |
| Surface # | | Curvature Radius | Thickness | Material | Index | Abbe # | Focal length |
| 0 | Object | Plano | Infinity | | | | |
| 1 | Lens 1 | 0.79598 (ASP) | 0.700 | Plastic | 1.544 | 55.9 | 1.93 |
| 2 | | 2.25996 (ASP) | 0.078 | | | | |
| 3 | Ape. Stop | Plano | 0.329 | | | | |
| 4 | Lens 2 | -1.33940 (ASP) | 1.205 | Plastic | 1.632 | 23.4 | -5.76 |
| 5 | | -2.85756 (ASP) | 0.050 | | | | |
| 6 | IR-filter | Plano | 0.300 | Glass | 1.517 | 64.2 | - |
| 7 | | Plano | 0.543 | | | | |
| 8 | Image | Plano | | | | | |

Fig.4

| TABLE 2 | | | | |
|---|---|---|---|---|
| Aspheric Coefficients | | | | |
| Surface # | 1 | 2 | 4 | 5 |
| k = | -1.02880E+00 | -2.45391E+01 | -4.35922E+00 | -2.28425E+00 |
| A4 = | 1.70245E-01 | 3.20435E-01 | -9.33569E-01 | -1.37024E-01 |
| A6 = | 5.74929E-01 | -1.67176E+00 | -3.79730E+00 | 9.25351E-03 |
| A8 = | -1.17744E+00 | 9.34813E+00 | 2.06034E+01 | -3.14090E-02 |
| A10= | 1.89259E+00 | -2.94307E+01 | -7.43405E+01 | -3.32853E-02 |
| A12= | -4.68932E-01 | 4.02002E+01 | -2.39773E+02 | 4.60819E-02 |
| A14= | | | | -2.21358E-02 |

Fig.5

| TABLE 3 | | | | | | |
|---|---|---|---|---|---|---|
| (Embodiment 2) | | | | | | |
| f = 3.02 mm, Fno = 2.90, HFOV = 30.0 deg. | | | | | | |
| Surface # | | Curvature Radius | Thickness | Material | Index | Abbe # | Focal length |
| 0 | Object | Plano | Infinity | | | | |
| 1 | Lens 1 | 0.83085 (ASP) | 0.539 | Plastic | 1.544 | 55.9 | 2.03 |
| 2 | | 2.58190 (ASP) | 0.071 | | | | |
| 3 | Ape. Stop | Plano | 0.503 | | | | |
| 4 | Lens 2 | -1.75006 (ASP) | 1.305 | Plastic | 1.632 | 23.4 | -4.11 |
| 5 | | -6.92130 (ASP) | 0.050 | | | | |
| 6 | IR-filter | Plano | 0.200 | Glass | 1.517 | 64.2 | - |
| 7 | | Plano | 0.050 | | | | |
| 8 | Cover-glass | Plano | 0.400 | Glass | 1.517 | 64.2 | - |
| 9 | | Plano | 0.242 | | | | |
| 10 | Image | Plano | | | | | |

Fig.6

| TABLE 4 | | | | |
|---|---|---|---|---|
| Aspheric Coefficients | | | | |
| Surface # | 1 | 2 | 4 | 5 |
| k = | 2.76972E-01 | 5.50154E+00 | 9.64251E+00 | 1.88846E+00 |
| A4 = | -1.22063E-01 | 8.27387E-02 | -4.76502E-01 | -6.59210E-02 |
| A6 = | 3.81422E-01 | -1.50413E+00 | 1.91983E+00 | -4.89231E-02 |
| A8 = | -2.18561E+00 | 1.89515E+01 | -1.85328E+01 | 1.10419E-02 |
| A10= | 4.09196E+00 | -1.03238E+02 | 7.36241E+01 | 5.57318E-03 |
| A12= | -4.36337E+00 | 2.13066E+02 | -1.46470E+02 | -5.70795E-03 |

Fig.7

| TABLE 5 | | | | | | |
|---|---|---|---|---|---|---|
| (Embodiment 3) | | | | | | |
| f = 4.22 mm, Fno =3.00, HFOV = 27.6deg. | | | | | | |
| Surface # | | Curvature Radius | Thickness | Material | Index | Abbe # | Focal length |
| 0 | Object | Plano | Infinity | | | | |
| 1 | Lens 1 | 1.23468 (ASP) | 0.587 | Plastic | 1.543 | 56.5 | 3.67 |
| 2 | | 2.70343 (ASP) | 0.107 | | | | |
| 3 | Ape. Stop | Plano | 0.736 | | | | |
| 4 | Lens 2 | -7.63440 (ASP) | 1.760 | Plastic | 1.530 | 55.8 | -27.61 |
| 5 | | -17.24100 (ASP) | 0.727 | | | | |
| 6 | IR-filter | Plano | 0.300 | Glass | 1.517 | 64.2 | - |
| 7 | | Plano | 0.522 | | | | |
| 8 | Image | Plano | | | | | |

Fig.8

| TABLE 6 | | | | |
|---|---|---|---|---|
| Aspheric Coefficients | | | | |
| Surface # | 1 | 2 | 4 | 5 |
| k = | -3.05459E-01 | 0.00000E+00 | 0.00000E+00 | 6.18781E+01 |
| A4 = | 3.40233E-03 | 5.77771E-02 | -8.46780E-02 | 1.16109E-02 |
| A6 = | 1.13567E-01 | -7.84600E-02 | -2.66308E-01 | -3.21126E-02 |
| A8 = | -1.49193E-01 | 4.10756E-01 | 5.03438E-01 | 1.72335E-02 |
| A10= | 1.83221E-01 | -6.23201E-01 | -5.98275E-01 | -5.21946E-03 |
| A12= | -8.49845E-02 | | | 5.65453E-04 |

Fig.9

| TABLE 7 | | | |
|---|---|---|---|
| | Embodiment 1 | Embodiment 2 | Embodiment 3 |
| f | 2.91 | 3.02 | 4.22 |
| Fno | 2.80 | 2.90 | 3.00 |
| HFOV | 26.5 | 30.0 | 27.6 |
| V2 | 23.4 | 23.4 | 55.8 |
| V1-V2 | 32.5 | 32.5 | 0.7 |
| CT2/f | 0.41 | 0.43 | 0.42 |
| CT2/CT1 | 1.72 | 2.42 | 3.00 |
| R1/R2 | 0.35 | 0.32 | 0.46 |
| R3/R4 | 0.47 | 0.25 | 0.44 |
| f/f1 | 1.51 | 1.49 | 1.15 |
| f/f2 | -0.51 | -0.74 | -0.15 |
| f1/f2 | -0.34 | -0.49 | -0.13 |
| Bf/f | 0.27 | 0.25 | 0.34 |
| SL/TTL | 0.75 | 0.81 | 0.85 |
| TTL/ImgH | 2.16 | 1.81 | 2.07 |

Fig.10

COMPACT IMAGING LENS ASSEMBLY

CROSS-REFERENCE TO RELATED APPLICATIONS

This non-provisional application claims priority under 35 U.S.C. §119(a) on Patent Application No(s). 098141324 filed in Taiwan, R.O.C. on Dec. 3, 2009, the entire contents of which are hereby incorporated by reference.

BACKGROUND OF THE INVENTION

1. Field of the Invention

The present invention relates to a compact imaging lens assembly, and more particularly to a compact imaging lens assembly used in a mobile phone camera.

2. Description of the Prior Art

In recent years, with the popularity of mobile phone cameras, the demand for compact imaging lenses is increasing, and the sensor of a general photographing camera is none other than CCD (charge coupled device) or CMOS device (Complementary Metal Oxide Semiconductor device). Furthermore, as advanced semiconductor manufacturing technology has allowed the pixel size of sensors to be reduced and the resolution of compact imaging lenses has gradually increased, there is an increasing demand for compact imaging lenses featuring better image quality.

A conventional lens assembly for mobile phone cameras, in order to compensate aberrations, generally comprises three lens elements, most notably with Triplet type having the power property of positive negative positive. However, as the lens size becomes more compact, image formation space of a system also becomes very limited. Therefore, the insertion of three lens elements becomes difficult. Due to limited space, the lens thickness must also decrease, which will cause the lens made by the plastic injection molding to have uneven distribution of materials.

Two-lens element assembly becomes a viable solution to shorten the total track length of the lens assembly while having high yield in production. U.S. Pat. No. 7,463,433 has disclosed a compact imaging lens assembly composed of two lens elements, which in order from an object side to an image side: a first lens element with positive refractive power and a second lens element with negative refractive power. Even though this assembly type can provide better resolution while maintaining compact size, due to first lens element being bi-convex, all lenses within the system will have higher refractive power, which increases the sensitivity of the optic system and also makes it difficult to control yield in manufacturing.

Therefore, a need exists in the art for a compact imaging lens assembly that requires simple manufacturing process, maintains a moderate total track length and is applicable to high-resolution mobile phone cameras.

SUMMARY OF THE INVENTION

The present invention provides a compact imaging lens assembly including, in order from the object side to the image side: a first lens element with positive refractive power having a convex object-side surface and a concave image-side surface, at least one of the object-side and the image-side surfaces thereof being aspheric; a second lens element with negative refractive power having a concave object-side surface and a convex image-side surface, at least one of the object-side and the image-side surfaces thereof being aspheric; and an aperture stop disposed between the first and the second lens elements; wherein there are only two lens elements with refractive power; wherein a focal length of the compact imaging lens assembly is f, a focal length of the second lens element is f2, a radius of curvature of the object-side surface of the second lens element is R3, a radius of curvature of the image-side surface of the second lens element is R4, a thickness of the second lens element on the optical axis is CT2, an electronic sensor is provided for the image formation of an object on the image plane in the compact imaging lens assembly, a distance on the optical axis between the aperture stop and the electronic sensor is SL, a distance on the optical axis between the object-side surface of the first lens element and the electronic sensor is TTL, and they satisfy the following relations: $-1.20<f/f2<-0.10$, $0.08<R3/R4<0.90$, $0.20<CT2/f<0.70$, $0.60<SL/TTL<0.90$.

In another aspect, the present invention provides another compact imaging lens assembly including, in order from the object side to the image side: a first lens element with positive refractive power having a convex object-side surface and a concave image-side surface, both surfaces thereof being aspheric; a second lens element with negative refractive power having a concave object-side surface and a convex image-side surface, both surfaces thereof being aspheric; and an aperture stop disposed between the first and second lens elements; wherein there are only two lens elements with refractive power; wherein a thickness of the second lens element on the optical axis is CT2, a thickness of the first lens element on the optical axis is CT1, a focal length of the first lens element is f1, a focal length of the second lens element is f2, a distance on the optical axis between the image-side surface of the second lens element and the imaging plane is Bf, a focal length of the compact imaging lens assembly is f, an electronic sensor is provided for the image formation of an object on the image plane in the compact imaging lens assembly, a distance on the optical axis between the aperture stop and the electronic sensor is SL, a distance on the optical axis between the object-side surface of the first lens element and the electronic sensor is TTL, and they satisfy the following relations: $1.4<CT2/CT1<4.0$, $-0.60<f1/f2<-0.06$, $0.10<Bf/f<0.55$, $0.60<SL/TTL<0.90$.

In another aspect, the present invention provides another compact imaging lens assembly including, in order from the object side to the image side: a first lens element with positive refractive power having a convex object-side surface and a concave image-side surface, at least one of the object-side and the image-side surfaces thereof being aspheric; a second lens element with negative refractive power having meniscus shape, at least one of the object-side and the image-side surfaces thereof being aspheric; and an aperture stop disposed between the first and second lens elements; wherein there are only two lens elements with refractive power; and wherein an Abbe number of the first lens element is V1, an Abbe number of the second lens element is V2, a focal length of the compact imaging lens assembly is f, a focal length of the second lens element is f2, an electronic sensor is provided for the image formation of an object on the image plane in the compact imaging lens assembly, a distance on the optical axis between the aperture stop and the electronic sensor is SL, a distance on the optical axis between the object-side surface of the first lens element and the electronic sensor is TTL, and they satisfy the following relations: $25.0<V1-V2<40.0$, $V2<28.5$, $-1.20<f/f2<-0.10$, $0.60<SL/TTL<0.90$.

The aforementioned arrangement of optical elements can effectively reduce the total track length, lower the sensitivity of the lens assembly, and improve image quality of the system.

In the aforementioned imaging lens assembly, the first lens element with positive refractive power, having a convex object-side surface and a concave image-side surface, provides the main source of refractive power and is advantageous in correcting Astigmatism of the system. The second lens element with negative refractive power can effectively offset aberrations caused by the positive refractive power of the first lens element and is beneficial in correcting the chromatic aberration of the system at the same time.

In the aforementioned compact imaging lens assembly, the second lens element can have meniscus shape with a concave object-side surface and a convex image-side surface. The shape of the lens element can effectively reduce the angle at which the light is projected onto the sensor from the off-axis field and raise the sensitivity of the light detection in the assembly. In addition, when both the first and second lens elements are meniscus in shape, the refractive power of each lens element in the assembly will not be too strong so that system sensitivity can be reduced and overly increasing high order aberrations can be avoided in order to obtain higher imaging quality of the system.

In the aforementioned compact imaging lens assembly, the aperture stop is disposed between the first and second lens elements. Through providing positive refractive power from the first lens element and placing the aperture stop near the object side of the assembly, the total track length of the compact imaging lens assembly can be reduced effectively. The aforementioned arrangement also enables the exit pupil of the compact imaging lens assembly to be positioned far away from the image plane; thus light will be projected onto the electronic sensor at a nearly perpendicular angle, which is the telecentric feature of the image side. The telecentric feature is very important to the photosensitive power of the current solid-state sensor as it can improve the photosensitivity of the sensor to reduce the probability of the shading occurrence. Moreover, a wide angle of view is an important feature of the present imaging lens assembly. In wide angle optical system, the correction of distortion and chromatic aberration of magnification is necessary and can be achieved by placing the aperture stop at the location where the refractive power of the system is balanced. Therefore, in the aforementioned compact imaging lens assembly, the aperture stop is disposed between the first and second lens elements for obtaining a balance in telecentricity and wide angle feature.

BRIEF DESCRIPTION OF THE DRAWINGS

FIG. 2A shows an imaging lens assembly in accordance with a second embodiment of the present invention.

FIG. 4 is TABLE 1 which lists the optical data of the first embodiment.

FIG. 5 is TABLE 2 which lists the aspheric surface data of the first embodiment.

FIG. 6 is TABLE 3 which lists the optical data of the second embodiment.

FIG. 7 is TABLE 4 which lists the aspheric surface data of the second embodiment.

FIG. 8 is TABLE 5 which lists the optical data of the third embodiment.

FIG. 9 TABLE 6 which lists the aspheric surface data of the third embodiment.

FIG. 10 is TABLE 7 which lists the data of the respective embodiments resulting from the equations.

DETAILED DESCRIPTION OF THE PREFERRED EMBODIMENTS

Figure 1A:
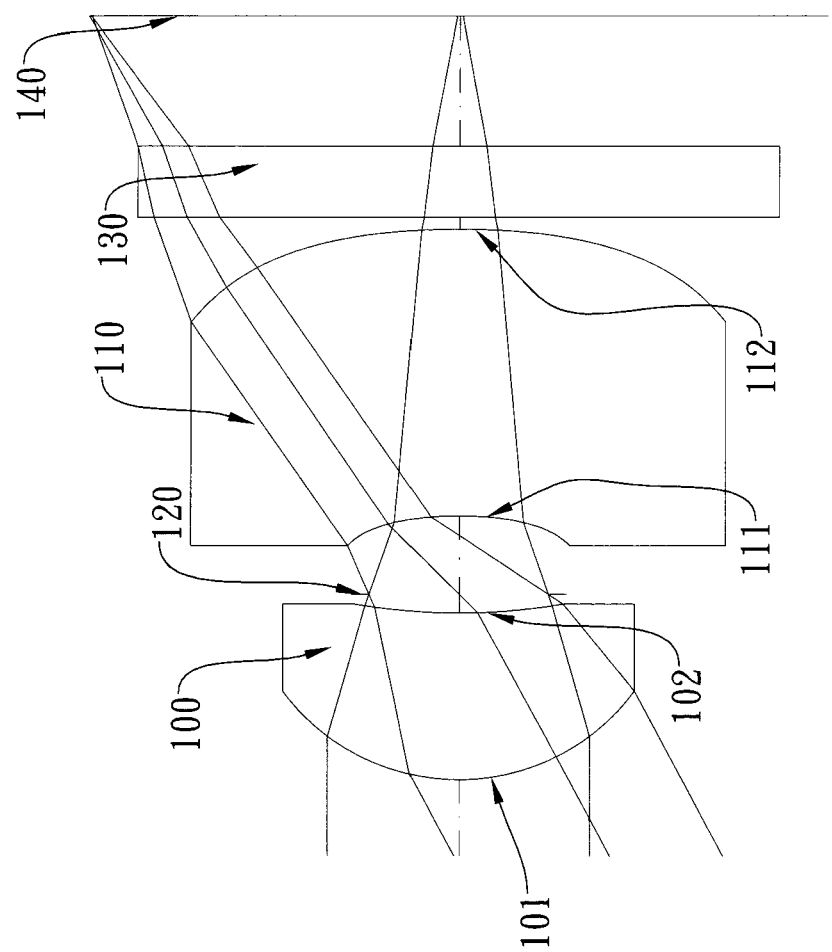
FIG. 1A shows an imaging lens assembly in accordance with a first embodiment of the present invention.

The present invention provides a compact imaging lens assembly including, in order from the object side to the image side: a first lens element with positive refractive power having a convex object-side surface and a concave image-side surface, at least one of the object-side and image-side surfaces thereof being aspheric; a second lens element with negative refractive power having a concave object-side surface and a convex image-side surface, at least one of the object-side and image-side surfaces thereof being aspheric; and an aperture stop disposed between the first and the second lens elements; wherein there are only two lens elements with refractive power; wherein a focal length of the compact imaging lens assembly is f, a focal length of the second lens element is f2, a radius of curvature of the object-side surface of the second lens element is R3, a radius of curvature of the image-side surface of the second lens element is R4, a thickness of the second lens element on the optical axis is CT2, an electronic sensor is provided for the image formation of an object on the image plane in the compact imaging lens assembly, a distance on the optical axis between the aperture stop and the electronic sensor is SL, a distance on the optical axis between the object-side surface of the first lens element and the electronic sensor is TTL, and they satisfy the following relations: $-1.20<f/f2<-0.10$, $0.08<R3/R4<0.90$, $0.20<CT2/f<0.70$, $0.60<SL/TTL<0.90$.

When the aforementioned compact imaging lens assembly satisfies the relation: $-1.20<f/f2<-0.10$, it can correct the chromatic aberration in the compact imaging lens assembly; preferably, it satisfies the following relation: $-0.80<f/f2<-0.40$. When the aforementioned compact imaging lens assembly satisfies the following relation: $0.08<R3/R4<0.90$, high order aberrations of the system can be effectively corrected; preferably, it satisfies the following relation: $0.20<R3/R4<0.60$. When the aforementioned compact imaging lens assembly satisfies the relation: $0.20<CT2/f<0.70$, it can provide better moldability and homogeneity of the plastic-injection-molded lenses to ensure the good imaging quality of the compact imaging lens assembly; preferably, it satisfies the following relation: $0.35<CT2/f<0.45$. When the aforementioned compact imaging lens assembly satisfies the relation: $0.60<SL/TTL<0.90$, it can balance between the telecentricity and the wide angle characteristic in the compact imaging lens assembly, and the aforementioned arrangement can effectively reduce the sensitivity of the compact imaging lens assembly.

In the aforementioned compact imaging lens assembly of the present invention, preferably, the first lens element having both object-side and image-side surfaces aspheric, made of plastic materials, and the second lens element having both object-side and image-side surfaces aspheric, made of plastic materials. Aspheric surfaces can be easily made into non-spherical profiles, allowing more design parameter freedom to reduce aberrations and the number of the lens elements and to shorten the total track length of the compact imaging lens assembly; utilizing plastic materials also helps the aspheric lens production and effectively lowers the production costs.

In the aforementioned compact imaging lens assembly of the present invention, the focal length of the compact imaging assembly is f, the focal length of the first lens element is f1, and, preferably, they satisfy the following relation: $1.00<f/f1<1.80$. When f/f1 satisfies the previously mentioned relation, the arrangement of the refractive power of the first lens element is in balance, which effectively limits the total track length of the lens assembly, maintains its compact size, and prevents the high order spherical aberration from becoming too large, in order to improve the imaging quality; preferably, it satisfies the following relation: $1.30<f/f1<1.70$.

In the aforementioned compact imaging lens assembly of the present invention, the thickness of the second lens element on the optical axis is CT2, the thickness of the first lens element on the optical axis is CT1, and, preferably, they satisfy the following relation: $2.0<CT2/CT1<3.0$. When the previously mentioned CT2/CT1 relation is satisfied, within limited lens space, the arrangement according to the thickness of each lens element is more balanced and can avoid generating too much high order aberrations.

In the aforementioned compact imaging lens assembly of the present invention, the radius of curvature of the object-side surface of the first lens element is R1, the radius of curvature of the image-side surface of the first lens element is R2, and, preferably, they satisfy the following relation: $0.20<R1/R2<0.50$. When the previously mentioned R1/R2 relation is satisfied, the arrangement of the refractive power of the first lens element is more balanced, which can reduce the total track length of the assembly and avoid generating too much high order aberrations.

In the aforementioned compact imaging lens assembly of the present invention, the focal length of the first lens element is f1, the focal length of the second lens element is f2, and, preferably, they satisfy the following relation: $-0.55<f1/f2<-0.20$. When the previously mentioned f1/f2 relation is satisfied, the arrangement of the refractive power of the first and second lens elements is more balanced, which helps correct the aberrations and reduce the sensitivity.

In the aforementioned compact imaging lens assembly of the present invention, the Abbe number of the first lens element is V1, the Abbe number of the second lens element is V2, and, preferably, they satisfy the following relation: $25.0<V1-V2<40.0$, $V2<28.5$. When V1 and V2 satisfy the previously mentioned relations, the chromatic aberration of the compact imaging lens assembly can be corrected.

In the aforementioned compact imaging lens assembly of the present invention, an electronic sensor is provided for the image formation of an object on the image plane, and the distance on the optical axis between the object-side surface of the first lens element and the electronic sensor is TTL, half of the diagonal length of the effective pixel area on the electronic sensor is ImgH, and preferably, they satisfy the following relation: $TTL/ImgH<2.3$. When the previously mentioned TTL/ImgH relation is satisfied, the size of the compact imaging lens assembly can be reduced for integration in light mobile electronics.

Another aspect of the present invention, a compact imaging lens assembly includes, in order from the object side to the image side: a first lens element with positive refractive power having a convex object-side surface and a concave image-side surface, both the object-side and image-side surfaces thereof being aspheric; a second lens element with negative refractive power having a concave object-side surface and a convex image-side surface, both the object-side and image-side surfaces thereof being aspheric; and an aperture stop disposed between the first and second lens elements; wherein there are only two lens elements with refractive power; wherein a thickness of the second lens element on the optical axis is CT2, a thickness of the first lens element on the optical axis is CT1, a focal length of the first lens element is f1, a focal length of the second lens element is f2, a distance on the optical axis between the image-side surface of the second lens element and the image plane is Bf, a focal length of the compact imaging lens assembly is f, an electronic sensor is provided for the image formation of an object on the image plane in the compact imaging lens assembly, a distance on the optical axis between the aperture stop and the electronic sensor is SL, a distance on the optical axis between the object-side surface of the first lens element and the electronic sensor is TTL, and they satisfy the following relations: $1.4<CT2/CT1<4.0$, $-0.60<f1/f2<-0.06$, $0.10<Bf/f<0.55$, $0.60<SL/TTL<0.90$.

When the aforementioned compact imaging lens assembly satisfies the following relation: $1.4<CT2/CT1<4.0$, within limited lens space, the arrangement of the thickness of each lens is more balanced and it avoids generating too much high order aberrations; preferably, the following relation is satisfied: $2.0<CT2/CT1<3.0$. When the aforementioned compact imaging lens assembly satisfies the following relation: $-0.60<f1/f2<-0.06$, the arrangement of the refractive power of the first and second lens elements will be more balanced, which can reduce aberrations and sensitivity; preferably, the following relation is satisfied: $-0.55<f1/f2<-0.20$. When the aforementioned compact imaging lens assembly satisfies the following relation: $0.10<Bf/f<0.55$, there will be enough room within back focal distance for additional item insertions. When aforementioned compact imaging lens assembly satisfies the following relation: $0.60<SL/TTL<0.90$, the balance of telecentricity and wide angle characteristic can be achieved, and this arrangement can effectively reduce the sensitivity of the compact imaging lens assembly.

In aforementioned compact imaging lens assembly of the present invention, the focal length of the compact imaging lens assembly is f, the focal length of the first lens element is f1, and, preferably, the following relation is satisfied: $1.30<f/f1<1.70$. When the previously mentioned f/f1 relation is satisfied, the arrangement of the refractive power of the first lens element is more balanced, which can effectively limit the total track length of the lens assembly, maintaining its compact size, and prevent the high order spherical aberration from becoming too large, in order to increase the imaging quality.

In the aforementioned compact imaging lens assembly of the present invention, the radius of curvature of the object-side surface of the first lens element is R1, the radius of curvature of the image-side surface of the first lens element is R2, and, preferably, the following relation is satisfied: $0.20<R1/R2<0.50$. When the previously mentioned R1/R2 relation is satisfied, the arrangement of the refractive power of the first lens element is more balanced, which can reduce the total track length of the lens assembly and avoid generating too much high order aberrations.

In the aforementioned compact imaging lens assembly of the present invention, the Abbe number of the first lens element is V1, the Abbe number of the second lens element is V2, and, preferably, the following relation is satisfied: $25.0<V1-V2<40.0$, $V2<28.5$. When V1 and V2 satisfy the previously mentioned relations, the chromatic aberration of the lens assembly can be corrected.

In the aforementioned compact imaging lens assembly of the present invention, the radius of curvature of the object-side surface of the second lens element is R3, the radius of curvature of the image-side surface of the second lens element is R4, and, preferably, the following relation is satisfied:

0.20<R3/R4<0.60. When the previously mentioned R3/R4 relation is satisfied, high order aberration of the system can be corrected.

Another aspect of the present invention, a compact imaging lens assembly includes, in order from the object side to the image side: a first lens element with positive refractive power having a convex object-side surface and a concave image-side surface, at least one of the object-side and the image-side surfaces thereof being aspheric; a second lens element with negative refractive power having a meniscus shape, at least one of the object-side and image-side surfaces thereof being aspheric; and an aperture stop disposed between the first and second lens elements; wherein there are only two lens elements with refractive power; and wherein an Abbe number of the first lens element is V1, an Abbe number of the second lens element is V2, a focal length of the compact imaging lens assembly is f, a focal length of the second lens element is f2, an electronic sensor is provided for the image formation of an object on the image plane in the compact imaging lens assembly, a distance on the optical axis between the aperture stop and the electronic sensor is SL, a distance on the optical axis between the object-side surface of the first lens element and the electronic sensor is TTL, and the following relations are satisfied: 25.0<V1−V2<40.0, V2<28.5, −1.20<f/f2<−0.10, 0.60<SL/TTL<0.90.

When the aforementioned compact imaging lens assembly satisfies the following relation: 25.0<V1−V2<40.0 and V2<28.5, chromatic aberration of the compact imaging lens assembly can be corrected. When the aforementioned compact imaging lens assembly satisfies the following relation: −1.20<f/f2<−0.10, chromatic aberration of the compact imaging lens assembly can be corrected, and the distribution of the refractive power of the second lens element refractive power will be more balanced, which reduces the sensitivity of the system, and, preferably, the following relation is satisfied: −0.85<f/f2<−0.30. When aforementioned compact imaging lens assembly satisfies the following relation: 0.60<SL/TTL<0.90, the balance of telecentricity and wide angle characteristic can be achieved, and this arrangement can effectively reduce the sensitivity of the compact imaging lens assembly.

In the aforementioned compact imaging lens assembly of the present invention, preferably, the second lens element has a concave object-side surface and a convex image-side surface, which can effectively reduce the angle at which the light is projected onto the sensor from the off-axis field and raise the sensitivity of the light detection in the assembly.

In the aforementioned compact imaging lens assembly of the present invention, the focal length of the compact imaging lens assembly is f, the focal length of the first lens element is f1, the thickness of the second lens element on the optical axis is CT2, and, preferably, the following relations are satisfied: 1.00<f/f1<1.80, 0.35<CT2/f<0.45. When the previously mentioned f/f1 relation is satisfied, the distribution of the refractive power of the first lens element is more balanced which reduces the total track length of the system, maintains its compact size and prevents high order spherical aberration from becoming too large in order to increase the image quality; when the previously mentioned CT2/f relation is satisfied, it improves the moldability and homogeneity of the plastic-injection-molded lenses which ensures the high image quality of the compact imaging lens assembly.

In the aforementioned compact imaging lens assembly of the present invention, the distance between the image-side surface of the second lens element and the image plane is Bf, the focal length of the compact imaging lens assembly is f, and, preferably, the following relation is satisfied: 0.10<Bf/f<0.55. When the previously mentioned Bf/f relation is satisfied, there will be enough room within back focal distance for additional item insertions.

In the compact imaging lens assembly of the present invention, the lens elements can be made of glass or plastic materials. If the lens elements are made of glass, there is more freedom in distributing the refractive power of the system. If plastic material is adopted to produce lens elements, the production cost will be effectively reduced. Additionally, the surfaces of the lens elements can be aspheric and easily made into non-spherical profiles, allowing more freedom in design parameters to reduce aberrations and the number of the lens elements, so that the total track length of the compact imaging lens assembly can be reduced effectively.

In the compact imaging lens assembly of the present invention, if the lens surface is stated as convex, it means the lens surface is convex in proximity of the optical axis; if the lens surface is stated as concave, it means the lens surface is concave in proximity of the optical axis.

Preferred embodiments of the present invention will be described in the following paragraphs by referring to the accompanying drawings.

Figure 1B:
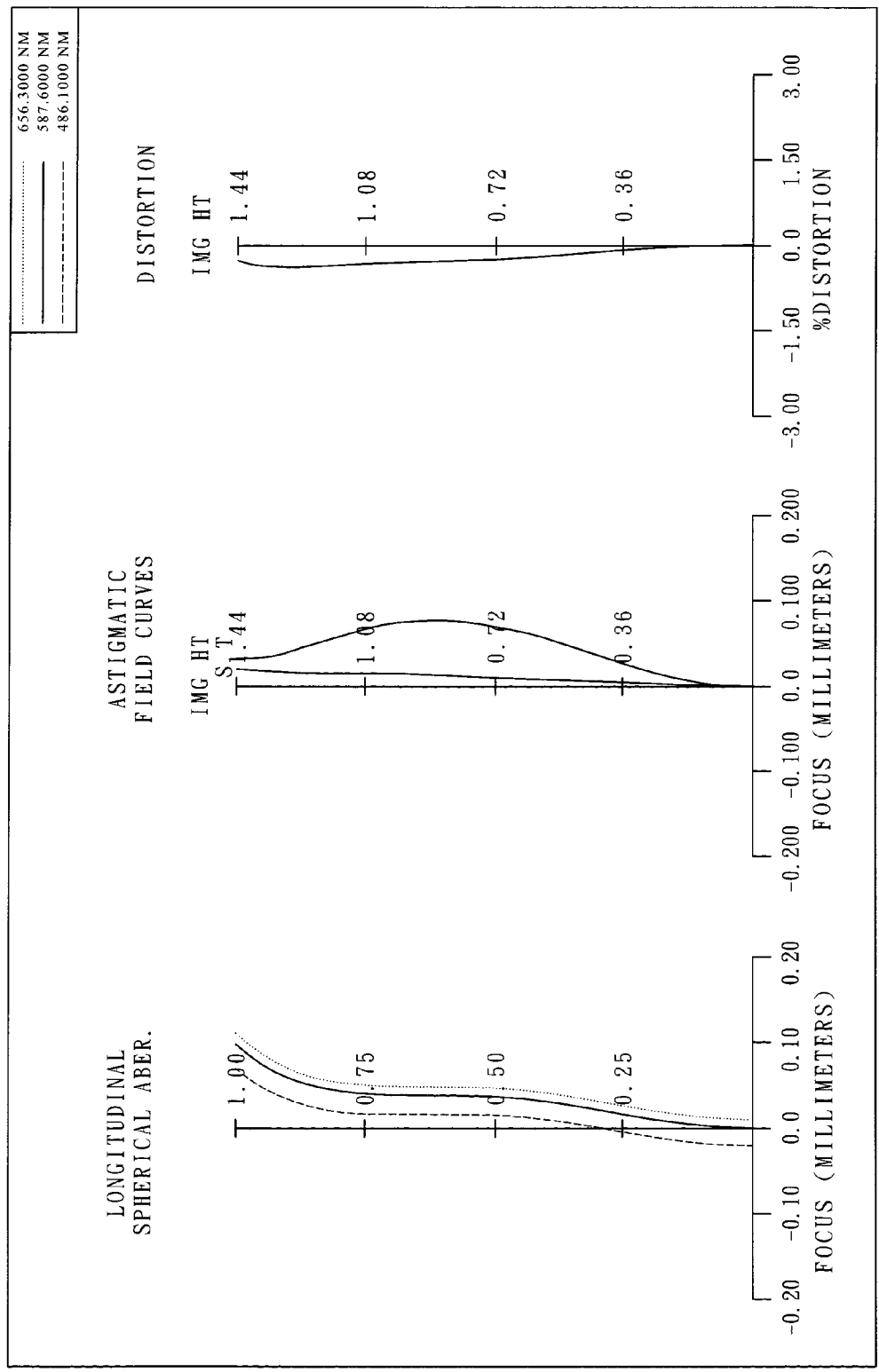
FIG. 1B shows the aberration curves of the first embodiment of the present invention.

FIG. 1A shows a compact imaging lens assembly in accordance with a first embodiment of the present invention, and FIG. 1B shows the aberration curves of the first embodiment of the present invention. The compact imaging lens assembly of the first embodiment of the present invention mainly comprises two lens elements including, in order from the object side to the image side: a plastic first lens element 100 with positive refractive power having a convex object-side surface 101 and a concave image-side surface 102, both the object-side surface 101 and image-side surface 102 thereof being aspheric; a plastic second lens element 110 with negative refractive power having a concave object-side surface 111 and a convex image-side surface 112, both the object-side surface 111 and image-side surface 112 thereof being aspheric; wherein an aperture stop 120 is disposed between the first lens element 100 and the second lens element 110; wherein an IR filter 130 is disposed between the image-side surface 112 of the second lens element 110 and an image plane 140; and wherein the IR filter 130 is made of glass and has no influence on the focal length of the compact imaging lens assembly.

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

wherein:

X: the horizontal distance between a point on the aspheric surface at a distance Y from the optical axis and the vertex on the optical axis tangential to the aspheric surface;

Y: the distance from the point on the curve of the aspheric surface to the optical axis;

k: the conic coefficient;

Ai: the aspheric coefficient of order i.

In the first embodiment of the present compact imaging lens assembly, the focal length of the compact imaging lens assembly is f, and it satisfies the relation: f=2.91 (mm).

In the first embodiment of the present compact imaging lens assembly, the f-number of the compact imaging lens assembly is Fno, and it satisfies the relation: Fno=2.80.

In the first embodiment of the present compact imaging lens assembly, half of the field of view of the compact imaging lens assembly is HFOV, and it satisfies the relation: HFOV=26.5 (degrees).

In the first embodiment of the present compact imaging lens assembly, the focal length of the compact imaging lens assembly is f, the focal length of the second lens element 110 is f2, and they satisfy the relation: f/f2=−0.51.

In the first embodiment of the present compact imaging lens assembly, the radius of curvature of the object-side surface of the second lens element 110 is R3, the radius of curvature of the image-side surface of the second lens element 110 is R4, and they satisfy the relation: R3/R4=0.47.

In the first embodiment of the present compact imaging lens assembly, the thickness of the second lens element 110 on the optical axis is CT2, the focal length of the compact imaging lens assembly is f, and they satisfy the relation: CT2/f=0.41.

In the first embodiment of the present compact imaging lens assembly, an electronic sensor is provided for the image formation of an object on the image plane 140 in the compact imaging lens assembly, the distance on the optical axis between the aperture stop 120 and the electronic sensor is SL, the distance on the optical axis between the object-side surface 101 of the first lens element 100 and the electronic sensor is TTL, and they satisfy the relation: SL/TTL=0.75.

In the first embodiment of the present compact imaging lens assembly, the focal length of the compact imaging lens assembly is f, the focal length of the first lens element 100 is f1, and they satisfy the relation: f/f1=1.51.

In the first embodiment of the present compact imaging lens assembly, the thickness of the second lens element 110 on the optical axis is CT2, the thickness of the first lens element 100 is CT1, and they satisfy the relation: CT2/CT1=1.72.

In the first embodiment of the present compact imaging lens assembly, the radius of curvature of the object-side surface of the first lens element 100 is R1, the radius of curvature of the image-surface of the first lens element 100 is R2, and they satisfy the relation: R1/R2=0.35.

In the first embodiment of the present compact imaging lens assembly, the focal length of the first lens element 100 is f1, the focal length of the second lens element 110 is f2, and they satisfy the relation: f1/f2=−0.34.

In the first embodiment of the present compact imaging lens assembly, the Abbe number of the first lens element 100 is V1, the Abbe number of the second lens element 110 is V2, and they satisfy the relation: V2=23.4; V1−V2=32.5.

In the first embodiment of the present compact imaging lens assembly, an electronic sensor is provided for the image formation of an object on the image plane 140 in the compact imaging lens assembly, the distance on the optical axis between the object-side surface 101 of the first lens 100 and the electronic sensor is TTL, half of the diagonal length of the effective pixel area on the electronic sensor is ImgH, and they satisfy the relation: TTL/ImgH=2.16.

In the first embodiment of the present compact imaging lens assembly, the distance on the optical axis between the image-side surface 112 of the second lens 110 and the imaging plane 140 is Bf, the focal length of the compact imaging lens assembly is f, and they satisfy the relation: Bf/f=0.27.

The detailed optical data of the first embodiment is shown in FIG. 4 (TABLE 1), and the aspheric surface data is shown in FIG. 5 (TABLE 2), wherein the units of the radius of curvature, the thickness and the focal length are expressed in mm, and HFOV is half of the maximal field of view.

Figure 2B:
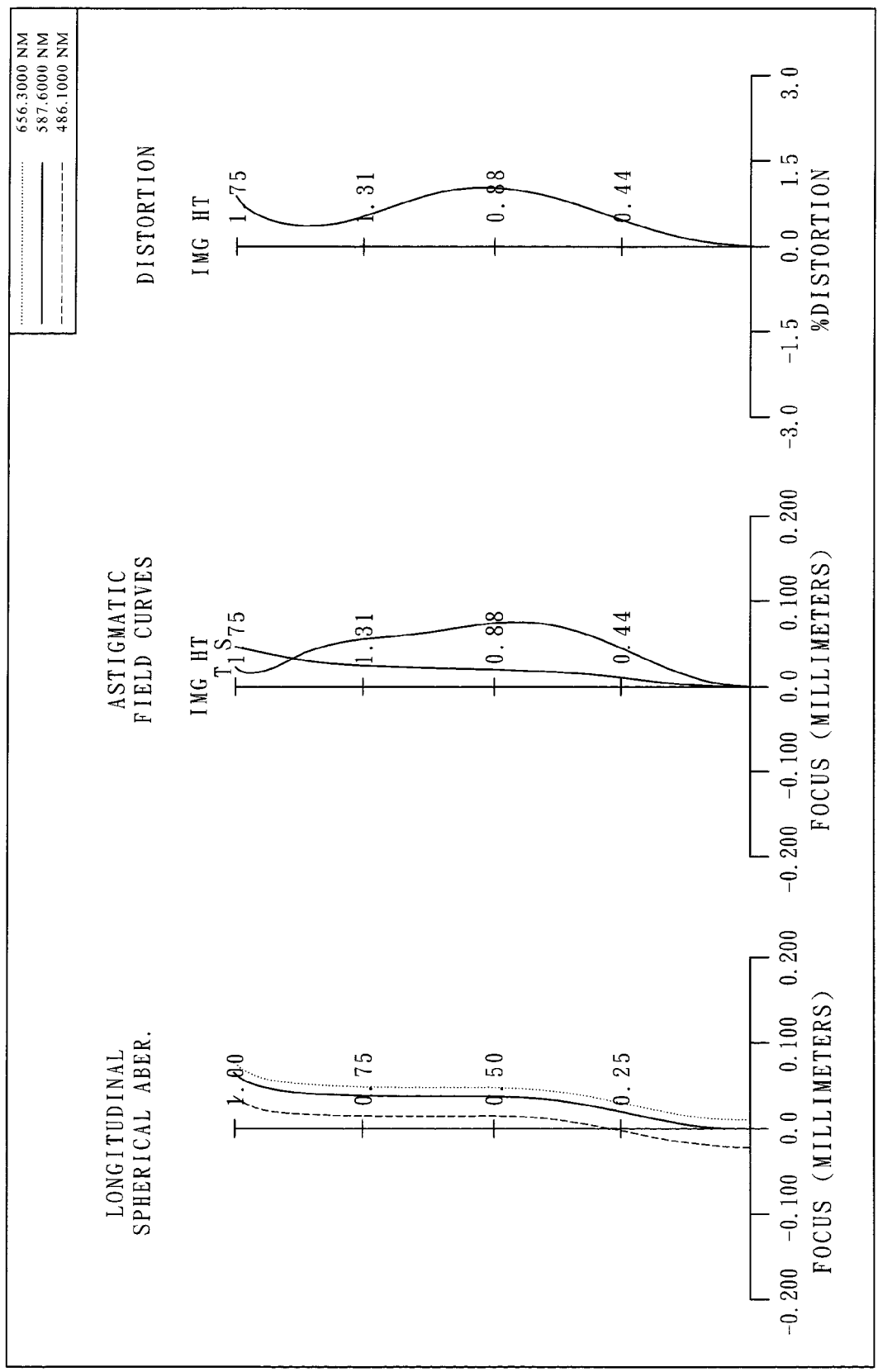
FIG. 2B shows the aberration curves of the second embodiment of the present invention.

FIG. 2A shows a compact imaging lens assembly in accordance with a second embodiment of the present invention, and FIG. 2B shows the aberration curves of the second embodiment of the present invention. The compact imaging lens assembly of the second embodiment of the present invention mainly comprises two lens elements including, in order from the object side to the image side: a plastic first lens element 200 with positive refractive power having a convex object-side surface 201 and a concave image-side surface 202, both the object-side surface 201 and image-side surface 202 thereof being aspheric; a plastic second lens element 210 with negative refractive power having a concave object-side surface 211 and a convex image-side surface 212, both the object-side surface 211 and image-side surface 212 thereof being aspheric; wherein an aperture stop 220 is disposed between the first lens element 200 and the second lens element 210; wherein an IR filter 230 and a cover glass 240 are disposed between the image-side surface 212 of the second lens element 210 and an image plane 250; and wherein the IR filter 230 and the cover glass 240 are made of glass and have no influence on the focal length of the compact imaging lens assembly.

The equation of the aspheric surface profiles of the second embodiment has the same form as that of the first embodiment.

In the second embodiment of the present compact imaging lens assembly, the focal length of the compact imaging lens assembly is f, and it satisfies the relation: f=3.02 (mm).

In the second embodiment of the present compact imaging lens assembly, the f-number of the compact imaging lens assembly is Fno, and it satisfies the relation: Fno=2.90.

In the second embodiment of the present compact imaging lens assembly, half of the field of view of the compact imaging lens assembly is HFOV, and it satisfies the relation: HFOV=30.0 (degrees).

In the second embodiment of the present compact imaging lens assembly, the focal length of the compact imaging lens assembly is f, the focal length of the second lens element 210 is f2, and they satisfy the relation: f/f2=−0.74.

In the second embodiment of the present compact imaging lens assembly, the radius of curvature of the object-side surface of the second lens 210 element is R3, the radius of curvature of the image-side surface of the second lens element 210 is R4, and they satisfy the relation: R3/R4=0.25.

In the second embodiment of the present compact imaging lens assembly, the thickness of the second lens element 210 on the optical axis is CT2, the focal length of the compact imaging lens assembly is f, and they satisfy the relation: CT2/f=0.43.

In the second embodiment of the present compact imaging lens assembly, an electronic sensor is provided for the image formation of an object on the image plane 250 in the compact imaging lens assembly, the distance on the optical axis between the aperture stop 220 and the electronic sensor is SL, the distance on the optical axis between the object-side surface 201 of the first lens element 200 and the electronic sensor is TTL, and they satisfy relation: SL/TTL=0.81.

In the second embodiment of the present compact imaging lens assembly, the focal length of the compact imaging lens assembly is f, the focal length of the first lens element 200 is f1, and they satisfy the relation: f/f1=1.49.

In the second embodiment of the present compact imaging lens assembly, the thickness of the second lens element 210 on the optical axis is CT2, the thickness of the first lens element 200 is CT1, and they satisfy the relation: CT2/CT1=2.42.

In the second embodiment of the present compact imaging lens assembly, the radius of curvature of the object-side surface of the first lens element 200 is R1, the radius of curvature of the image-surface of the first lens element 200 is R2, and they satisfy the relation: R1/R2=0.32.

In the second embodiment of the present compact imaging lens assembly, the focal length of the first lens element 200 is f1, the focal length of the second lens element 210 is f2, and they satisfy the relation: f1/f2=−0.49.

In the second embodiment of the present compact imaging lens assembly, the Abbe number of the first lens element 200 is V1, the Abbe number of the second lens element 210 is V2, and they satisfy the relation: V2=23.4; V1−V2=32.5.

In the second embodiment of the present compact imaging lens assembly, an electronic sensor is provided for the image formation of an object on the image plane 250 in the compact imaging lens assembly, the distance on the optical axis between the object-side surface 201 of the first lens 200 and the electronic sensor is TTL, half of the diagonal length of the effective pixel area on the electronic sensor is ImgH, and they satisfy the relation: TTL/ImgH=1.81.

In the second embodiment of the present compact imaging lens assembly, the distance on the optical axis between the image-side surface 212 of the second lens 210 and the imaging plane 250 is Bf, the focal length of the compact imaging lens assembly is f, and they satisfy the relation: Bf/f=0.25.

The detailed optical data of the second embodiment is shown in FIG. 6 (TABLE 3), and the aspheric surface data is shown in FIG. 7 (TABLES 4), wherein the units of the radius of curvature, the thickness and the focal length are expressed in mm, and HFOV is half of the maximal field of view.

Figure 3A:
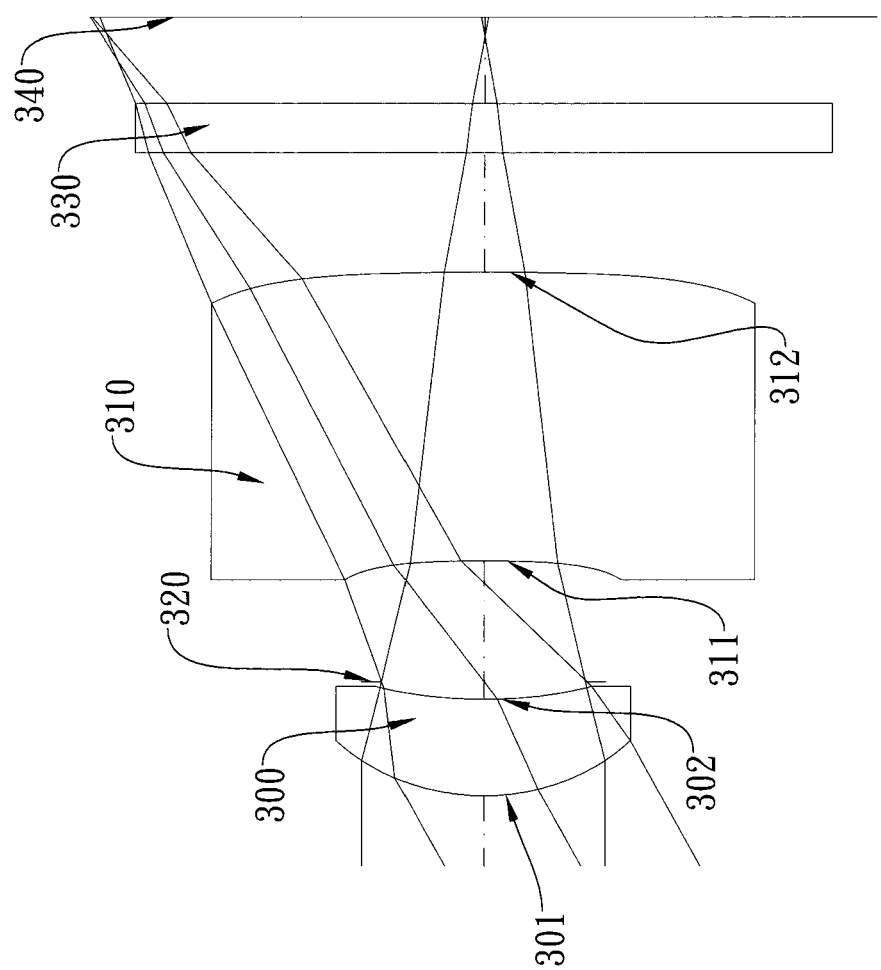
FIG. 3A shows an imaging lens assembly in accordance with a third embodiment of the present invention.
Figure 3B:
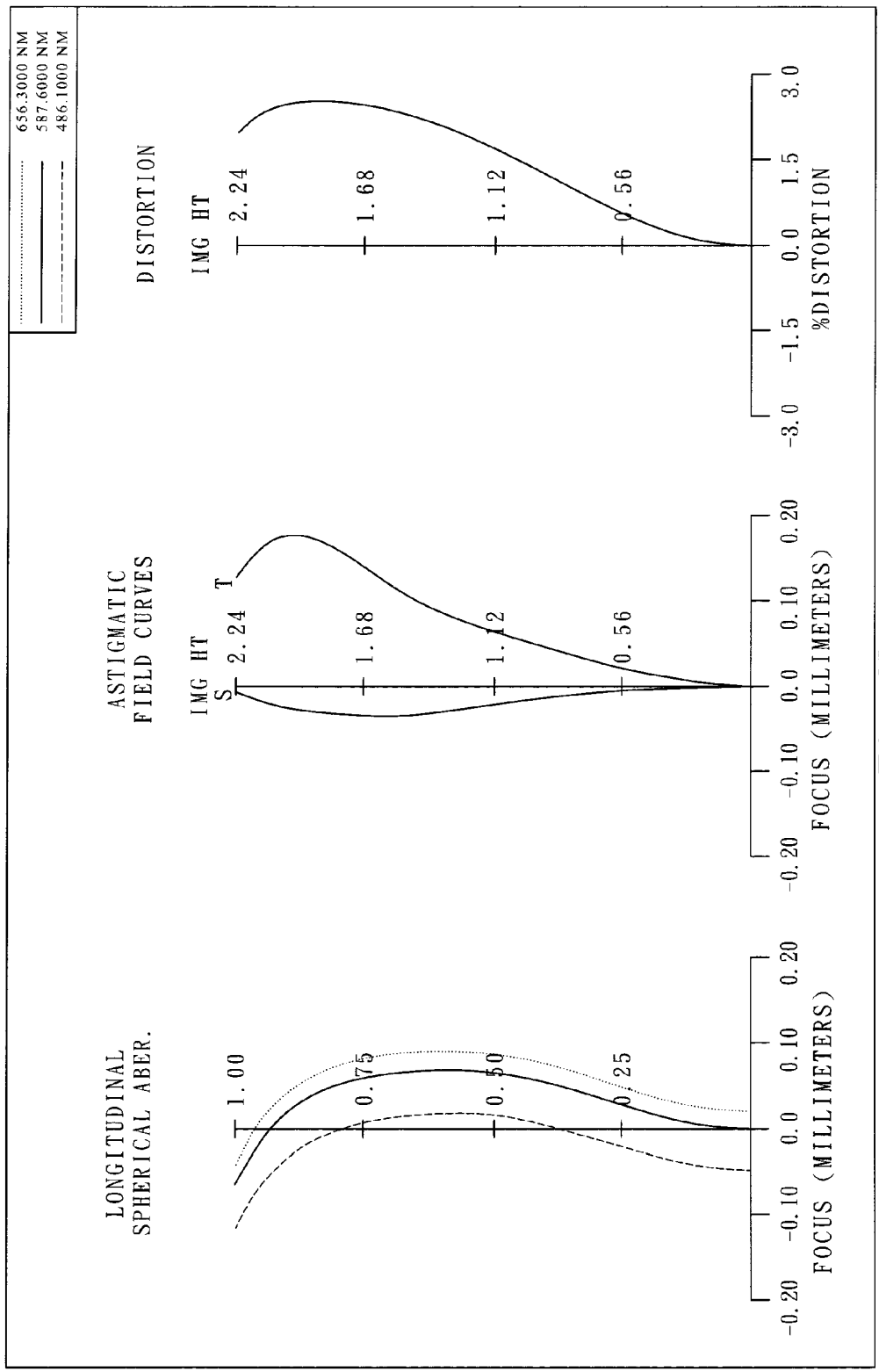
FIG. 3B shows the aberration curves of the third embodiment of the present invention.

FIG. 3A shows a compact imaging lens assembly in accordance with a third embodiment of the present invention, and FIG. 3B shows the aberration curves of the third embodiment of the present invention. The compact imaging lens assembly of the third embodiment of the present invention mainly comprises two lens elements including, in order from the object side to the image side: a plastic first lens element 300 with positive refractive power having a convex object-side surface 301 and a concave image-side surface 302, both the object-side surface 301 and image-side surface 302 thereof being aspheric; a plastic second lens element 310 with negative refractive power having a concave object-side surface 311 and a convex image-side surface 312, both the object-side surface 311 and image-side surface 312 thereof being aspheric; wherein an aperture stop 320 is disposed between the first lens element 300 and the second lens element 310; wherein an IR filter 330 is disposed between the image-side surface 312 of the second lens element 310 and an image plane 340; and wherein the IR filter 330 is made of glass and has no influence on the focal length of the compact imaging lens assembly.

The equation of the aspheric surface profiles of the third embodiment has the same form as that of the first embodiment.

In the third embodiment of the present compact imaging lens assembly, the focal length of the compact imaging lens assembly is f, and it satisfies the relation: f=4.22 (mm).

In the third embodiment of the present compact imaging lens assembly, the f-number of the compact imaging lens assembly is Fno, and it satisfies the relation: Fno=3.00.

In the third embodiment of the present compact imaging lens assembly, half of the field of view of the compact imaging lens assembly is HFOV, and it satisfies the relation: HFOV=27.6 (degrees).

In the third embodiment of the present compact imaging lens assembly, the focal length of the compact imaging lens assembly is f, the focal length of the second lens element 310 is f2, and they satisfy the relation: f/f2=−0.15.

In the third embodiment of the present compact imaging lens assembly, the radius of curvature of the object-side surface of the second lens element 310 is R3, the radius of curvature of the image-side surface of the second lens element 310 is R4, and they satisfy the relation: R3/R4=0.44.

In the third embodiment of the present compact imaging lens assembly, the thickness of the second lens element 310 on the optical axis is CT2, the focal length of the compact imaging lens assembly is f, and they satisfy the relation: CT2/f=0.42.

In the third embodiment of the present compact imaging lens assembly, an electronic sensor is provided for the image formation of an object on the image plane 340 in the compact imaging lens assembly, the distance on the optical axis between the aperture stop 320 and the electronic sensor is SL, the distance on the optical axis between the object-side surface 301 of the first lens element 300 and the electronic sensor is TTL, and they satisfy relation: SL/TTL=0.85.

In the third embodiment of the present compact imaging lens assembly, the focal length of the compact imaging lens assembly is f, the focal length of the first lens element 300 is f1, and they satisfy the relation: f/f1=1.15.

In the third embodiment of the present compact imaging lens assembly, the thickness of the second lens element 310 on the optical axis is CT2, the thickness of the first lens element 300 is CT1, and they satisfy the relation: CT2/CT1=3.00.

In the third embodiment of the present compact imaging lens assembly, the radius of curvature on the object-side surface of the first lens element 300 is R1, the radius of curvature on the image-surface of the first lens element 300 is R2, and they satisfy the relation: R1/R2=0.46.

In the third embodiment of the present compact imaging lens assembly, the focal length of the first lens element 300 is f1, the focal length of the second lens element 310 is f2, and they satisfy the relation: f1/f2=−0.13.

In the third embodiment of the present compact imaging lens assembly, the Abbe number of the first lens element 300 is V1, the Abbe number of the second lens element 310 is V2, and they satisfy the relation: V2=55.8, V1−V2=0.7.

In the third embodiment of the present compact imaging lens assembly, an electronic sensor is provided for the image formation of an object on the image plane 340 in the compact imaging lens assembly, the distance on the optical axis between the object-side surface 301 of the first lens 300 and the electronic sensor is TTL, half of the diagonal length of the effective pixel area on the electronic sensor is ImgH, and they satisfy the relation: TTL/ImgH=2.07.

In the third embodiment of the present compact imaging lens assembly, the distance on the optical axis between the image-side surface 312 of the second lens 310 and the imaging plane 340 is Bf, the focal length of the compact imaging lens assembly is f, and they satisfy the relation: Bf/f=0.34.

The detailed optical data of the third embodiment is shown in FIG. 8 (TABLE 5), and the aspheric surface data is shown in FIG. 9 (TABLE 6), wherein the units of the radius of curvature, the thickness and the focal length are expressed in mm, and HFOV is half of the maximal field of view.

It is to be noted that TABLES 1-6 (illustrated in FIGS. 4-9 respectively) show different data of the different embodiments, however, the data of the different embodiments are obtained from experiments. Therefore, any imaging lens assembly of the same structure is considered to be within the scope of the present invention even if it uses different data. The embodiments depicted above are exemplary and are not intended to limit the claim scope of the present invention. TABLE 7 (illustrated in FIG. 10) shows the data of the respective embodiments resulted from the equations.

What is claimed is:

1. A compact imaging lens assembly including, in order from an object side to an image side:
a first lens element with positive refractive power having a convex object-side surface and a concave image-side surface, at least one of the object-side and image-side surfaces thereof being aspheric;
a second lens element with negative refractive power having a concave object-side surface and a convex image-side surface, at least one of the object-side and image-side surfaces thereof being aspheric; and
an aperture stop disposed between the first lens element and the second lens element; wherein there are only two lens elements with refractive power; and wherein a focal length of the compact imaging lens assembly is f, a focal length of the first lens element is f1, a focal length of the second lens element is f2, a radius of curvature of the object-side surface of the second lens element is R3, a radius of curvature of the image-side surface of the second lens element is R4, a thickness of the second lens element on the optical axis is CT2, an electronic sensor is provided for the image formation of an object on the image plane in the compact imaging lens assembly, a distance on the optical axis between the aperture stop and the electronic sensor is SL, a distance on the optical axis between the object-side surface of the first lens element and the electronic sensor is TTL, and they satisfy the following relations: −1.20<f/f2<−0.10, 0.20<R3/R4<0.60, 0.20<CT2/f<0.70, 0.60<SL/TTL<0.90, −0.34<f1/f2<−0.06,
wherein the first lens element has aspheric object-side and image-side surfaces and is made of plastic material;
wherein the second lens element has aspheric object-side and image-side surfaces and is made of plastic material.

2. The compact imaging lens assembly according to claim 1, wherein the focal length of the compact imaging lens assembly is f, the focal length of the first lens element is f1, and they satisfy the relation: 1.00<f/f1<1.80.

3. The compact imaging lens assembly according to claim 2, wherein the focal length of the compact imaging lens assembly is f, the focal length of the first lens element is f1, and they satisfy the relation: 1.30<f/f1<1.70.

4. The compact imaging lens assembly according to claim 1, wherein the focal length of the compact imaging lens assembly is f, the focal length of the second lens element is f2, and they satisfy the relation: −0.80<f/f2<−0.40.

5. The compact imaging lens assembly according to claim 4, wherein the thickness of the second lens element on the optical axis is CT2, the focal length of the compact imaging lens assembly is f, and they satisfy the relation: 0.35<CT2/f<0.45.

6. The compact imaging lens assembly according to claim 1, wherein a radius of curvature of the object-side surface of the first lens element is R1, a radius of curvature of the image-side surface of the first lens element is R2, and they satisfy the relation: 0.20<R1/R2<0.50.

7. The compact imaging lens assembly according to claim 1, wherein the focal length of the first lens element is f1, the focal length of the second lens element is f2, and they satisfy the relation: −0.34<f1/f2<−0.20.

8. The compact imaging lens assembly according to claim 7, wherein an Abbe number of the first lens element is V1, an Abbe number of second lens element is V2, and they satisfy the relation: 25.0<V1−V2<40.0, V2<28.5.

9. The compact imaging lens assembly according to claim 1, wherein the electronic sensor is provided for the image formation of an object on the image plane in the compact imaging lens assembly, a distance on the optical axis between the object-side surface of the first lens element and the electronic sensor is TTL, half of the diagonal length of the effective pixel area on the electronic sensor is ImgH, and they satisfy the relation: TTL/ImgH<2.3.

10. A compact imaging lens assembly including, in order from an object side to an image side:
a first lens element with positive refractive power having a convex object-side surface and a concave image-side surface, the object-side and image-side surfaces thereof being aspheric;
a second lens element with negative refractive power having a concave object-side surface and a convex image-side surface, the object-side and image-side surfaces thereof being aspheric; and
an aperture stop disposed between the first lens element and the second lens element; wherein there are only two lens elements with refractive power; and wherein a thickness of the second lens element on the optical axis is CT2, a thickness of the first lens element on the optical axis is CT1, a focal length of the first lens element is f1, a focal length of the second lens element is f2, a distance on the optical axis between the image-side surface of the second lens and the image plane is Bf, a focal length of the compact imaging lens assembly is f, an electronic sensor is provided for the image formation of an object on the image plane in the compact imaging lens assembly, a distance on the optical axis between the aperture stop and the electronic sensor is SL, a distance on the optical axis between the object-side surface of the first lens element and the electronic sensor is TTL, and they satisfy the following relations: 1.4<CT2/CT1<4.0, −0.34≦f1/f2<−0.06, 0.10<Bf/f<0.55, 0.60<SL/TTL<0.90.

11. The compact imaging lens assembly according to claim 10, wherein the focal length of the compact imaging lens assembly is f, the focal length of the first lens element is f1, and they satisfy the relation: 1.30<f/f1<1.70.

12. The compact imaging lens assembly according to claim 11, wherein the focal length of the first lens element is f1, the focal length of the second lens element is f2, and they satisfy the relation: −0.34<f1/f2<−0.20.

13. The compact imaging lens assembly according to claim 12, wherein a radius of curvature of the object-side surface of the first lens element is R1, a radius of curvature of the image-side surface of the first lens element is R2, and they satisfy the relation: 0.20<R1/R2<0.50.

14. The compact imaging lens assembly according to claim 12, wherein a radius of curvature of the object-side surface of the second lens element is R3, a radius of curvature of the image-side surface of the second lens element is R4, and they satisfy the relation: 0.20<R3/R4<0.60.

15. The compact imaging lens assembly according to claim 10, wherein an Abbe number of the first lens element is V1, an Abbe number of the second lens element is V2, and they satisfy the relation: 25.0<V1−V2<40.0, V2<28.5.

16. A compact imaging lens assembly including, in order from an object side to an image side:
a first lens element with positive refractive power having a convex object-side surface and a concave image-side surface, at least one of the object-side and the image-side surfaces thereof being aspheric;

a second lens element with negative refractive power having a meniscus shape, at least one of the object-side surface and the image-side surface thereof being aspheric; and an aperture stop disposed between the first lens element and the second lens element; wherein there are only two lens elements with refractive power; and wherein an Abbe number of the first lens element is V1, an Abbe number of the second lens element is V2, a focal length of the compact imaging lens assembly is f, a focal length of the first lens element is f1, a focal length of the second lens element is f2, an electronic sensor is provided for the image formation of an object on the image plane in the compact imaging lens assembly, a distance on the optical axis between the aperture stop and the electronic sensor is SL, a distance on the optical axis between the object-side surface of the first lens element and the electronic sensor is TTL, and they satisfy the following relations: $25.0<V1-V2<40.0$, $V2<28.5$, $-1.20<f/f2<-0.10$, $0.60<SL/TTL<0.90$, $-0.34<f1/f2<-0.06$.

17. The compact imaging lens assembly according to claim 16, wherein the object-side surface of the second lens element is concave and the image-side surface of the second lens element is convex.

18. The compact imaging lens assembly according to claim 17, wherein the focal length of the compact imaging lens assembly is f, the focal length of the first lens element is f1, a thickness of the second lens element on the optical axis is CT2, and they satisfy the following relations: $1.00<f/f1<1.80$, $0.35<CT2/f<0.45$.

19. The compact imaging lens assembly according to claim 17, wherein the focal length of the compact imaging lens assembly is f, the focal length of the second lens element is f2, a distance on the optical axis between the image-side surface of the second lens and the image plane is Bf, and they satisfy the following relations: $-0.85<f/f2<-0.30$, $0.10<Bf/f<0.55$.

* * * * *